United States Patent
Albou et al.

(10) Patent No.: US 9,758,087 B2
(45) Date of Patent: Sep. 12, 2017

(54) SYSTEM AND METHOD FOR CONTROLLING A LIGHT BEAM AND CORRESPONDING LIGHTING AND/OR SIGNALING MODULE

(71) Applicant: Valeo Vision, Bobigny (FR)

(72) Inventors: Pierre Albou, Paris (FR); Vincent Godbillon, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/205,428

(22) Filed: Jul. 8, 2016

(65) Prior Publication Data

US 2017/0008446 A1 Jan. 12, 2017

(30) Foreign Application Priority Data

Jul. 10, 2015 (FR) ..................... 15 56627

(51) Int. Cl.
*B60Q 1/14* (2006.01)
*B60Q 1/08* (2006.01)
(Continued)

(52) U.S. Cl.
CPC ............... *B60Q 1/143* (2013.01); *B60Q 1/08* (2013.01); *B60Q 1/085* (2013.01); *F21S 48/115* (2013.01); *F21S 48/1154* (2013.01); *F21S 48/125* (2013.01); *F21S 48/13* (2013.01); *F21S 48/1388* (2013.01); *F21S 48/1757* (2013.01); *H05B 33/0845* (2013.01); *H05B 37/0227* (2013.01); *B60Q 2300/112* (2013.01); *B60Q 2300/122* (2013.01); *B60Q 2300/41* (2013.01); *B60Q 2300/42* (2013.01); *F21Y 2115/10* (2016.08)

(58) Field of Classification Search
CPC .......... H01J 25/55; H01J 25/587; H01J 23/20; H01J 23/207; H01J 23/005; B60Q 1/1415; B60Q 1/143; B60Q 1/44; B60Q 1/54; B60Q 2300/112; B60Q 1/1423; B60Q 9/001; B60Q 2300/314; B60Q 2300/42
See application file for complete search history.

(56) References Cited

U.S. PATENT DOCUMENTS 7,575,352 B2 8/2009 Sato et al.
9,162,611 B2 10/2015 Kay et al.
(Continued)

FOREIGN PATENT DOCUMENTS

EP 1621400 A1 2/2006
EP 2280215 A2 2/2011
(Continued)

*Primary Examiner* — Minh D A
(74) *Attorney, Agent, or Firm* — Jacox, Meckstroth & Jenkins

(57) ABSTRACT

A system and method for controlling an overall light beam emitted by an automotive vehicle headlamp and formed from selectively activatable beam segments produced independently from one another by illuminating means borne by the headlamp, the segments together forming an overall light beam when they are all activated and placed successively side-by-side.
The instantaneous speed of the vehicle is compared to a first preset speed threshold, and a zone of high light intensity to be produced when the instantaneous speed is higher than the first preset speed threshold is determined.

20 Claims, 2 Drawing Sheets

Figure 1:
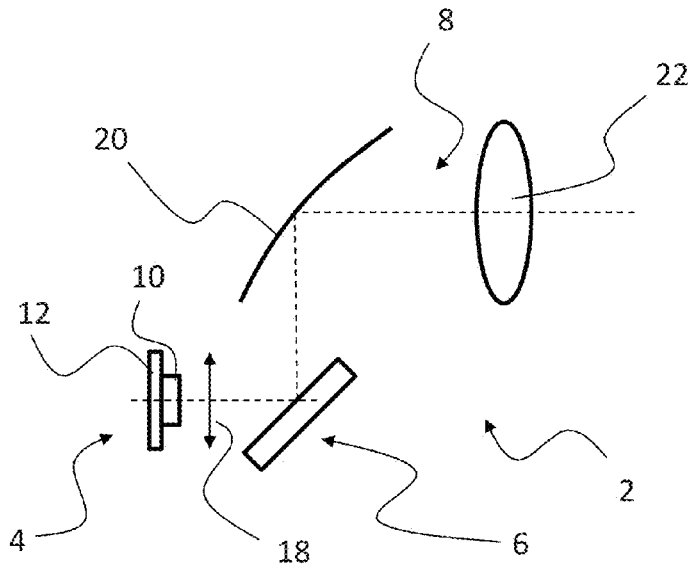

(51) Int. Cl.
    *F21S 8/10*        (2006.01)
    *H05B 33/08*     (2006.01)
    *H05B 37/02*     (2006.01)
    *F21Y 115/10*    (2016.01)

(56) References Cited

U.S. PATENT DOCUMENTS

| | | |
|---|---|---|
| 2009/0046474 A1 | 2/2009 | Sato et al. |
| 2013/0169154 A1 | 7/2013 | Kay et al. |
| 2015/0091439 A1* | 4/2015 | Wright .................. B60Q 1/143 |
| | | 315/82 |
| 2015/0142275 A1* | 5/2015 | Yamazaki .............. B60Q 1/115 |
| | | 701/49 |
| 2016/0096468 A1 | 4/2016 | Kay et al. |

FOREIGN PATENT DOCUMENTS

| | | |
|---|---|---|
| KR | 20140080156 A | 6/2014 |
| WO | 2015022115 A1 | 2/2015 |

\* cited by examiner

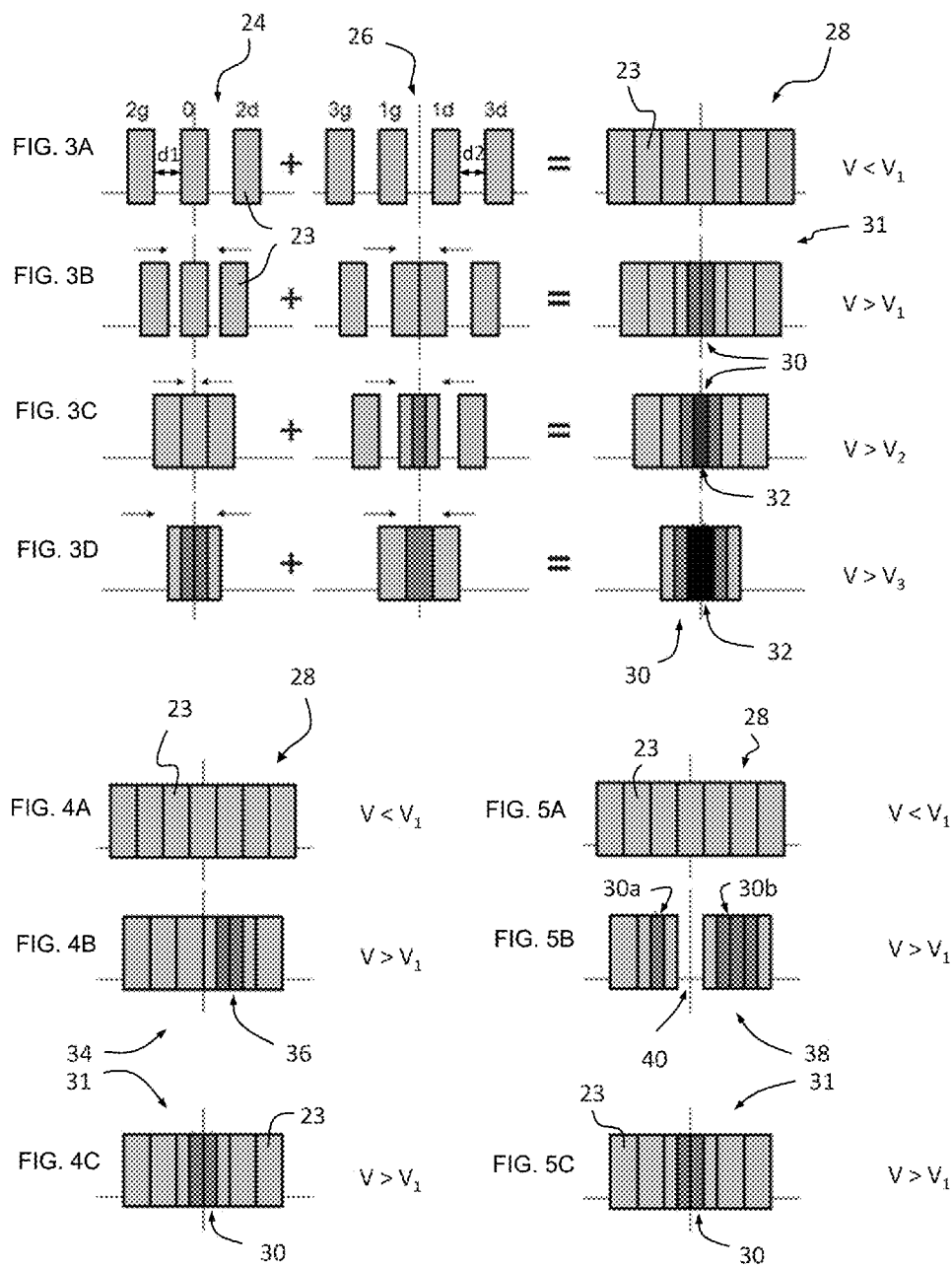

SYSTEM AND METHOD FOR CONTROLLING A LIGHT BEAM AND CORRESPONDING LIGHTING AND/OR SIGNALING MODULE

CROSS-REFERENCE TO RELATED APPLICATIONS

This application claims priority to the French application 1556627 filed Jul. 10, 2015, which applications are incorporated herein by reference and made a part hereof.

BACKGROUND OF THE INVENTION

1. Field of the Invention

The invention relates to the field of lighting and/or signaling, especially for automotive vehicles. More particularly, the invention relates to a method for controlling an overall light beam emitted by an automotive vehicle headlamp and obtained by adding intermediate beams produced by at least two illuminating means, and to light-emitting modules that may allow such controlling methods to be implemented.

2. Description of the Related Art

An automotive vehicle is equipped with headlamps, or headlights, intended to illuminate the road in front of the vehicle, at night or in case of low luminosity. These headlamps may generally be used in two lighting modes: a first "high-beam" mode and a second "low-beam" mode. The "high-beam" mode allows the road far in front of the vehicle to be brightly illuminated. The "low-beam" mode procures more limited illumination of the road, but one that nevertheless ensures a good visibility without however dazzling other road users. These two lighting modes are complementary. The driver of the vehicle must manually change mode depending on the circumstances, at the risk of inadvertently dazzling another road user. In practice, the need to change lighting mode manually may lead to a lack of reliability and sometimes prove to be dangerous. Furthermore, the low-beam mode sometimes procures a visibility that is unsatisfactory for the driver of the vehicle.

To improve the situation, headlamps equipped with an adaptive lighting function (especially known by the acronym AFS for "adaptive frontlighting system") have been proposed. Such an adaptive lighting function is intended to automatically detect, for example by processing images acquired by an on-board video camera, a road user liable to be dazzled by an illuminating beam emitted in high-beam mode by a headlamp, and to modify the outline of this illuminating beam so as to create a zone of shadow in the location of the detected user. The advantages of such an adaptive lighting function are multiple: greater user comfort, better visibility relative to a headlamp in low-beam mode, higher reliability as regards the mode change, greatly decreased risk of dazzle, and better road safety.

Document EP2280215 describes an example of an automotive vehicle headlamp lighting system equipped with an adaptive lighting function. The system comprises four primary optical elements, in each of which three light sources are associated with three respective light guides, and four secondary projecting optical elements, as it happens lenses, respectively associated with the four primary optical elements. The light emitted by each light source penetrates into the associated light guide and it exits via an exit end of the guide, of rectangular shape. The arrangement of the primary optical elements and of their associated secondary optical element means that the light emitted by each optical-guide exit end is projected by the secondary optical element so as to form, in front of the vehicle, one vertical luminous section. The luminous sections produced partially superpose in the horizontal direction. It is the actuation of the light sources, which may be turned on independently of one another, selectively, that is used to obtain the desired illumination and produce a complementary beam of the high-beam type that does not dazzle other road users. The beam is thus divided into a plurality of luminous sections that it is possible to activate or deactivate. The adaptive illuminating beam that may thus be produced merely by electronically controlling the turn-on of the light sources, and without mechanical movement of an additional shielding part, is especially known as a matrix beam.

Moreover, it is increasingly common to see automotive vehicles equipped with a directional lighting function, more widely known by the acronym DBL (for dynamic bending light), in which the objective is to illuminate the road and its sides when the vehicle turns. The headlamp is mounted so as to be able to pivot about a substantially vertical axis of rotation, and therefore when the vehicle corners, the projected beam output by the headlamp is oriented toward the inside of the corner rather than along the longitudinal axis of the vehicle.

SUMMARY OF THE INVENTION

The objective of the invention is to provide a method for controlling light beams that manages both the production of a matrix beam and the production of a directional beam and that is able to manage the switch from one to the other.

To this end, one subject of the invention is a method for controlling an overall light beam emitted by an automotive vehicle headlamp and formed from selectively activatable beam segments produced independently from one another by illuminating means borne by the headlamp, the segments together forming an overall light beam when they are all activated and placed successively side-by-side. Provision is made, according to the method of the invention, to compare the instantaneous speed of the vehicle to a first preset speed threshold, and to determine a zone of high light intensity to be produced when the instantaneous speed is higher than the first preset speed threshold.

In particular, provision will possibly be made, in one particular mode of implementation, for the overall light beam according to the invention to form a complementary high beam that is segmented by the presence of beam segments and intended to be associated with a low beam, for example by being juxtaposed with or superposed on the low beam to form a high beam.

It will be understood that the successively side by side arrangement of the beam segments possibly generates a partial overlap of two successive segments. Thus, not only is it possible to obtain an arrangement in which the beam segments are juxtaposed, edge to edge, so as to be contiguous pairwise, but it is also possible to obtain an arrangement in which the beam segments are juxtaposed and partially superposed so as to permit one segment to partially overlap another segment.

Which among the illuminating means are producing beam segments suitable for generating the illumination of the zone of high light intensity may be identified, and a movement of the illuminating means identified in the preceding step or indeed a movement of the illuminating means neighboring the illuminating means identified in the preceding step may be piloted so as to create a first specific overall light beam including the zone of high light intensity. The illuminating means are moved so as to cause the beam segments produced by these identified illuminating means to be at least partially superposed in the zone of high light intensity. It will be understood that it is for example possible to identify a target beam segment, produced by a target illuminating means, as a zone of high light intensity to be produced and that, subsequently, two illuminating means producing neighboring beam segment placed on either side of the target beam segment may be piloted so as to cause a superposition of these neighboring beam segments and of the target beam segment.

According to various features of the invention, which features may be implemented individually or in combination:

all of the illuminating means are kept turned on;

measures are taken to ensure that all of the beam segments are moved so as to maintain a continuity of illumination on either side of the zone of high light intensity;

measures are taken to ensure that the first specific overall light beam has a smaller width than that of the overall light beam.

According to features of one mode of implementation, in which various plateaus of vehicle speed are taken into account, the instantaneous speed of the vehicle is compared to at least one second preset speed threshold of higher value than the value of the first speed threshold, and, when the instantaneous speed is higher than the second speed threshold, the light intensity of the zone of high light intensity is increased by superposing other beam segments and by concentrating the overall light beam; whatever the first or second threshold beyond which the vehicle speed is detected may be, the orientation of advance of the vehicle is detected, and, when a situation of driving in a straight line is detected, the zone of high light intensity is placed, by superposing beam segments, substantially at the center of the overall light beam.

According to features of the invention, in a road scene in the vicinity of the vehicle, a specific situation in which a third-party vehicle is liable to be dazzled by the overall light beam may be detected. In this case, a first target zone in the overall beam including the third-party vehicle is determined, and those illuminating means borne by the headlamp which are producing the beam segments generating the illumination of the first target zone are identified. Next, a movement of the illuminating means identified in the preceding step is piloted so as to create a zone of lesser illumination corresponding to the first target zone, the zone of high light intensity then being split into two subzones placed on either side of the zone of lesser illumination.

According to other features of the invention, in a road scene in the vicinity of the vehicle, a specific situation in which the vehicle is confronted with a corner may be detected. In this case, a second target zone in the overall beam depending on the characteristics of the corner is determined, and those illuminating means borne by the headlamp which are producing the beam segments generating the illumination of the second target zone are identified. Next, a movement of the illuminating means identified in the preceding step is piloted so as to create a second zone of high light intensity corresponding to the second target zone.

In the latter two cases, the illuminating means are piloted, when it is detected that the specific situation has ended, to respectively take a position able to create the first specific overall light beam.

According to another series of features of the invention, which features may be implemented individually or in combination with the above:

the illuminating means include light sources and optical deviating means associated respectively with at least one of the light sources, each light source being commanded to turn on individually whereas the optical deviating means are commanded to move individually;

the overall light beam consists of an unsegmented complementary high beam of matrix type; the overall light beam is obtained by adding intermediate beams respectively produced by separate sets of illuminating means, the movement of the illuminating means of each set being piloted to create the zone of high light intensity;

the beam segments consist of vertical sections that are juxtaposed with one another, the movement of the illuminating means generating the movement of at least one of the sections and its superposition on other sections of the overall light beam.

The invention also relates to a light-emitting module for implementing the controlling method such as just described, and that in particular includes at least one light source and movably mounted optical deviating means.

According to various features specific to such a light-emitting module:

provision is made for an optical system for emitting a light beam, the optical deviating means being inserted between the light source and the optical system;

the optical system consists of a reflector and a projecting lens;

the light source includes a plurality of semiconductor sources;

the optical deviating means consist of micro-opto-electro-mechanical systems mounted so as to be rotatable between two end positions, the micro-opto-electro-mechanical systems being able to take at least one preset intermediate position between the two end positions;

the micro-opto-electro-mechanical systems are mounted so as to be able to rotate to pass from one of the end positions to the other, with an angular rotation comprised between 2° and 7°;

each micro-opto-electro-mechanical system consists of a mirror able to deviate the light rays emitted by the light source and mounted on a rotating axle borne by the module;

the microelectromechanical systems are arranged in a linear array;

provision is made for a primary optical device, especially a focusing or collimating lens, which device is placed between the light sources and the optical deviating means.

The invention also relates to an automotive lighting system including at least one light-emitting module such as described above, and at least means for detecting the instantaneous speed of the vehicle, means for analyzing the received detection information and calculating means including at least means for comparing the instantaneous speed to at least one preset threshold in order to provide, on the basis of at least one piece of information relating to the speed of the vehicle, movement command instructions to the optical deviating means.

In such a lighting system, provision will possibly be made for at least one light-emitting module such as described above to be placed in a left headlamp of the automotive vehicle and for at least one light-emitting module such as described above to be placed in a right headlamp of the vehicle, the modules being arranged so that the intermediate light beams that they generate add to form an overall light beam.

The lighting system may furthermore comprise means for detecting a third-party vehicle in a road scene and/or means for detecting a corner extending in front of the vehicle.

These and other objects and advantages of the invention will be apparent from the following description, the accompanying drawings and the appended claims.

BRIEF DESCRIPTION OF THE ACCOMPANYING DRAWINGS

Figure 2:
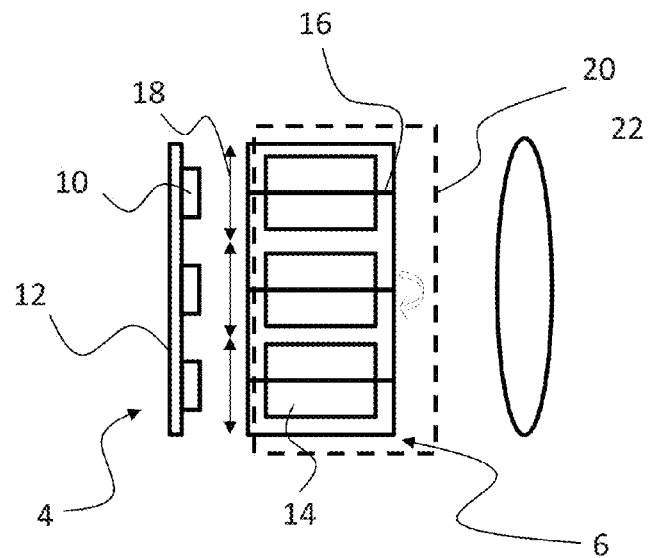

Other features and advantages of the present invention will become more clearly apparent from the description and appended drawings, in which:

FIG. 1 is a schematic representation, seen from the side, of a light-emitting module according to the invention, in which module are here shown a light source, a collimating lens, optical deviating means, a reflector and a projecting lens;

FIG. 2 is a schematic representation of the module in FIG. 1, seen from above, in which representation the reflector has been made see-through in order to make it easier to see the optical deviating means and the rotating axles of the microelectromechanical systems that form them; and FIGS. 3A-5C are schematics illustrating the operation of the invention, in which operation intermediate beams are pivoted to modify the overall light beam emitted by an automotive vehicle headlamp, FIGS. 3A-3D illustrate one mode of implementation in which the overall light beam is modified only depending on the speed of the vehicle, FIGS. 4A-4C illustrate one mode of implementation in which the overall light beam is furthermore modified depending on the detection of a corner situation, and FIGS. 5A-5C illustrate one mode of implementation in which the overall light beam is furthermore modified depending on the detection of a vehicle that could be dazzled.

DETAILED DESCRIPTION OF THE PREFERRED EMBODIMENTS

Firstly, an automotive vehicle lighting and/or signaling light-emitting module 2 according to a first embodiment, which is illustrated in FIGS. 1 and 2, will be described. The light-emitting module 2 includes at least one light source 4 able to emit light rays in the direction of first optical deviating means 6, and an optical system 8. Thus the light-emitting module 2 outputs an intermediate beam able to be added to other intermediate beams obtained by other light-emitting modules 2 placed in proximity in a given headlamp of the automotive vehicle or in another headlamp, so as to form an overall light beam. In the following description, the term optical plane will be used to mean the vertical plane including the optical axis. It will be noted that the optical plane corresponds to the plane of the sheet of paper in the illustration in FIG. 1.

As will be described below, at least the first optical deviating means 6 are commanded so that, when the instantaneous speed of the vehicle is higher than a first preset speed threshold, a portion of the overall light beam is concentrated to form a zone of high light intensity, i.e. a zone that is illuminated more brightly than the immediately neighboring zones.

Each light source here consists of a semiconductor source, and for example a light-emitting diode, that may be associated with a printed circuit board and a radiator for cooling the electronic components borne by the board.

As may be seen in FIG. 2, the module includes three separate light-emitting diodes 10 on a common printed circuit board 12. It will be understood that other configurations, both in terms of number and geometric arrangement, may be chosen without departing from the scope of the invention. In particular, in the description below of preferred modes of implementation of the invention, it will be seen that a vehicle lighting system may include a first light-emitting module 2 in which three light-emitting diodes 10 are able to produce three beam segments, and a second light-emitting module 2 in which four light-emitting diodes 10 are able to produce four beam segments, these seven segments being juxtaposed and/or superposed to form an overall light beam.

The first optical deviating means 6 consist of a plurality of micro-electromechanical systems (MEMS) arranged in a linear array in such a way that each of these microelectromechanical systems is placed facing a light-emitting diode 10 (or an individually addressable "light-emitting chip" of the light-emitting diode 10). The microelectromechanical systems extend longitudinally in front of the light sources 4, and they consist of movable mirrors 14 able to reflect some of the light rays emitted by the light source 4.

Each mirror 14 is mounted so as to be rotatable about an axle 16 borne by the light-emitting module 2, so as to pivot between two end positions, which positions are obtained by mechanical abutment of the rotation of the axle. Depending on the position of the mirrors 14 in the series, and therefore depending on the off-center or centered position of the light-beam segment generated by this mirror 14, a standard position of each mirror 14 is defined as being one of the two end positions, or indeed as the position at the center of the two end positions. For a diode 10 centered on the optical axis and the associated microelectromechanical system, which is also centered on the optical axis, the first standard position is calibrated so that the rays reflected by the mirror 14 thus oriented strike the optical system 8 placed downstream substantially in the optical plane, and the two end positions are calibrated, either on either side of the first standard position so that the rays reflected by the mirror 14 thus oriented strike the optical system 8 at a distance from the optical plane corresponding to half the width desired for the luminous sections forming the intermediate light beam, or indeed with one of the end positions corresponding to the standard position, and the other end position calibrated so that the rays reflected by the mirror 14 thus oriented strike the optical system 8 at a distance from the optical plane corresponding to the width desired for the luminous sections forming the intermediate light beam, in the direction of the center of the overall light beam.

It will be understood that when all the mirrors 14 are in the standard position, regular intermediate beams are obtained with component sections arranged at regular intervals. In contrast, if but one of the mirrors 14 of the optical deviating means 6 is pivoted, the intermediate beam is no longer regular, and the superposition of two intermediate beams implies a superposition of two sections of the matrix beam, and therefore a zone of higher light intensity.

In the angular range of rotation, which is advantageously chosen to be narrow, about 2° to 7°, the light reflected by the mirrors 14 in one or other of the extreme positions is integrally directed toward the projecting device located downstream on the path of the light rays. In their first end position, the optical deviating means 6 are able to deviate the light rays toward a first zone of the optical system 8 and in their second end position, the same optical deviating means 6 are able to deviate the light rays toward a second zone of the optical system 8.

It is furthermore particularly advantageous to note that the microsystems used in the invention are not binary. What is meant by this is that it is possible, depending on whether the type of microsystems chosen are for example electrostatically, piezoelectrically or magnetically controlled, for voltage or current control instructions to be used to choose any angle of rotation in the angular range of +/−7° i.e. the choice is not limited to one or other of the extreme positions.

In particular, provision may be made, for each microsystem, for predefined intermediate positions that will be able to be adopted by these microsystems to form a beam segment associated with a predefined state, as will be described below.

Optionally, a primary optic is placed between the first optical deviating means 6 and the light source 4, in addition to the optical system 8 placed at the exit of the light-emitting module 2, to improve efficiency and to prevent beam overlap. This primary optic may be a collimating or focusing lens 18.

The optical system 8 is placed at the exit of the light-emitting module 2 on the path of the light rays emitted by the light-emitting diode 10 and deviated by the mirrors 14. Such as illustrated, the optical system 8 includes a reflector 20 and a projecting lens 22. It will be understood that other optical-system arrangements may be implemented without departing from the scope of the invention.

The light-emitting module 2 furthermore includes means for controlling the light sources 4 and microelectromechanical systems, able to pilot on the one hand the turn-on and turn-off or the modification of the light intensity emitted by each light source 4 of each light-emitting module 2, and on the other hand the rotation of the microelectromechanical systems depending on pieces of information regarding the driving conditions of the vehicle—among these pieces of information the controlling means receives at least one piece of information related to the detection of the speed of advance of the vehicle. This piece of information may be obtained by a sensor specific to the controlling method according to the invention, or indeed be obtained from a data transmission network of the vehicle. The controlling means include means for analyzing each and every piece of information transmitted by these detecting means.

Other pieces of information regarding driving conditions may be obtained and delivered to the controlling means. In particular, provision may be made for means for detecting, in the illuminated road scene, a vehicle not to be dazzled, and/or for means for detecting the presence of a corner in front of the vehicle. The detecting means may for example consist of a video camera turned toward the road scene extending in front of the vehicle and of associated image processing means, which allow a piece of detection information to be generated, which the detecting module is able to send to the means for controlling the rotation of the microelectromechanical systems. The means for detecting the presence of a corner in front of the vehicle may consist of a sensor of the angular speed of the vehicle, or indeed of an on-board satellite navigation system.

A light-emitting module 2 such as just described allows the method for controlling an overall light beam emitted by an automotive vehicle headlamp and obtained by adding intermediate beams produced by at least two illuminating means according to the invention to be implemented.

Firstly, light rays are emitted by the light-emitting diodes 10 of the light-emitting module 2 when the controlling module receives a piece of information relating to the automatic detection of high-beam driving conditions or a piece of information relating to a driver command.

The rays are directed substantially parallelly to the optical axis toward the movable mirrors 14 of the microelectromechanical systems, which mirrors 14 are located in the first standard position, and an intermediate beam of "high-beam" type, which is divided into a number of sections equal to the total number of light-emitting diodes 10, and corresponding mirrors 14, in the lighting system assembly, is formed as a result.

Depending on the pieces of information sent by the detecting means to a controlling module and independently of whether the pieces of information relate, on the one hand, to the speed of the vehicle and to the presence of a vehicle in the road scene illuminated by the beam produced beforehand, or on the other hand, to the presence of a corner in front of the vehicle, the controlling module identifies the zone of high light intensity to be produced and possibly the zone in which a detected vehicle is present and determines which of the light-emitting diodes 10 and associated microelectromechanical systems to move to produce an appropriate illumination of these zones.

The light rays deviated by a mirror represent a luminous section, here vertical, of the intermediate beam and the rotation by a few degrees of a mirror 14 generates a transverse movement of the corresponding luminous section. Such as was specified above, provision may be made for at least one intermediate position that the mirror 14 may adopt to generate an intermediate position of the corresponding beam segment, the position being between the standard position in which the mirror 14 forms the overall light beam and one end position.

Various modes of implementation of the controlling method will now be described with reference to FIGS. 3A 5C. In each of these modes of implementation, the overall light beam is obtained by adding two complementary intermediate light beams, in the case of an automotive vehicle lighting assembly in which two light-emitting modules 2 such as just described are housed in series in a headlamp the overall light beam of which, shown on the right in the figures, results from the addition of the intermediate beams of the two light-emitting modules 2 shown on the left in the figures.

Each of these figures illustrates a lighting sequence, each sequence showing, in succession, from top to bottom, with luminous beam segments 23 projected onto a vertical wall, the various states adopted by the overall light beam, depending on the piece(s) of information received by the controlling means associated with each module, FIGS. 3A-3D illustrate in greater detail the various states of the intermediate beam segments 23 and the combination thereof to form the overall light beam, whereas FIGS. 4A-5C show only the overall light beam.

Each of these figures illustrates one mode of implementation taking into consideration speed information such as provided for by the present invention.

FIGS. 3A-3D illustrate the case where only speed information is taken into consideration. FIG. 3A corresponds to a standard state with a speed of advance of the vehicle lower than a first preset threshold. A first light-emitting module 6 includes three light-emitting diodes 10, and when the latter are turned on a first intermediate beam 24 composed of three sections 2g, 0, 2d, which are spaced apart from one another in the transverse direction by a first set interval d1, is in particular formed by reflection of the emitted light from the optical deviating means. A second light-emitting module 2 for its part includes four light-emitting diodes 10 and when the latter are turned on a second intermediate beam 26 composed of four sections 3g, 1g, 1d, 3d, which are spaced apart from one another in the transverse direction by a second set interval d2, is formed. The light-emitting modules 2 are oriented relative to the optical axis of the vehicle so that, by addition of the two intermediate beams, an overall light beam 28 composed of a succession of beam segments 23, here taking the form of sections, is formed, it being understood that the sections of the first intermediate beam 24 have a width equal to the second interval d2 in order to lodge between the sections of the second intermediate beam 26 and that, conversely, the sections of the second intermediate beam 26 have a width equal to the first interval dl in order to lodge between the sections of the first intermediate beam 24. Such as illustrated, provision may be made for the sections to all have the same dimension and for the intervals between the sections to be the same in both the first and second intermediate beams 24, 26. It should be noted that according to the invention, the width of the sections may vary from one section to another depending on whether they are positioned at the center or edges of the beam. Provision is thus made for central sections to be narrower than lateral sections. As regards other nonuniform arrangements of the sections depending on their position, the intervals between the sections of a sub-beam may vary, and the angles of rotation of the sections may differ from one section to another.

It will be understood that provision may be made for sections at the edge of the beam not be movable and for them to be piloted simply by being turned on or off. Thus, the need to make them move through an angle of rotation of high value, which movement is complicated to implement, is avoided, such a movement being unjustifiable on account of the position of the section on the road. The system may therefore combine movable sections and immovable sections. However, the embodiments shown are embodiments in which, advantageously, all the sections may be moved to produce a continuous beam having a high overall light intensity without turning off any of the sources.

FIGS. 3B to 3D illustrate the production of a zone 30 of high light intensity at the center of the overall light beam, in the case where the speed of advance of the vehicle V is, in succession, higher than a first set threshold $V_1$, a second set speed threshold $V_2$ and a third set speed threshold $V_3$, where $V_1 < V_2 < V_3$. The fact that the vehicle is travelling at high speed implies that the driver must be able to anticipate possible modifications in driving conditions and, for example, obstacles possibly present on his route. Therefore it is advantageous to increase the light intensity at the center of the overall light beam by moving beam segments and piloting corresponding illuminating means in order to ensure the driver has a better view of what is going on in front of his vehicle, the latter travelling in a straight line. The concentration of the zone of high light intensity increases as speed is increased.

In FIG. 3B, a first specific overall light beam 31 is formed in which the zone 30 of high light intensity is obtained by superposing the beam segments 1g and 1d each respectively on one half of the beam segment 0. All of the microsystems, except that corresponding to the central beam segment 0, are pivoted so that beam segments other than that of the center move closer to the center by a distance equivalent to one beam-segment half-width.

It may be seen that the first specific overall light beam 31 is less wide than the overall light beam 28. Furthermore, more generally, it is worth noting that the higher the speed the narrower the overall light beam. This is due to the fact that the exterior beam segments 3g and 3d also track the gravitation of the beam segments toward the center of the overall beam, in order to retain a continuous overall beam, this being justified by the fact that, at high speed, it is less detrimental to be unable to see obstacles present beside and nearby the vehicle since the speed of the vehicle allows them to be passed without changing course.

In FIG. 3C, the light intensity of the zone 30 is further increased by superposition of beam segments. A band 32 of very high intensity is produced by superposing the beam segments 1g, 1d and 0. At least three beam segments are superposed to form this band 32. Here again, all the beam segments are moved closer to the center in order to preserve a continuous overall light beam. It will be observed that the width of the zone of high light intensity, i.e. the light intensity of which is higher than that of each of the segments of the overall light beam illustrated in FIG. 3A, is thus larger at this stage, with V higher than $V_2$, than the width of the zone of high intensity when V is lower than $V_2$.

Lastly, in FIG. 3D, the light intensity of the zone 30 is increased to its maximum, this once again creating a band 32 of very high intensity obtained this time by superposing at least four light beam segments. The observations made in the preceding paragraph also apply when V is higher than $V_3$. It will be understood that four separate steps have been shown here with three set speed thresholds to which the speed V of the vehicle is compared, but that this number could vary especially depending on the number of section segments.

FIGS. 4A-4D illustrate a state in which a corner has been detected and in which it is sought to create a second specific overall light beam 34 including a second zone 36 of high light intensity, which zone is different from the first zone 30 of high light intensity. This second zone is of high light intensity, since the speed of the vehicle V is higher than the first threshold $V_1$, and it is oriented toward the interior of the corner in order to optimize the driver's visibility of the road scene in front of the vehicle. To this end, the first intermediate beam 24 and the second intermediate beam 26 undergo movements, achieved by piloting the illuminating means, that are different from the preceding case in that the central beam segment 0 is shifted toward the interior of the corner and in that that of the beam segments which is immediately neighboring this central beam segment in the overall light beam and which is toward the interior of the corner, i.e. here the segment 1d, remains unchanged. The target zone onto which it is desired to direct this second zone of high light intensity is determined by the controlling means of the vehicle depending on the characteristics of the corner.

When the cornering situation has terminated, it is therefore possible to rapidly return to a high-speed, straight-line-motion lighting situation with a zone 30 of high light intensity at the center of a beam similar to the first specific overall light beam 31 (see FIG. 4C). It will be understood that according to the invention, the switch from one situation to the other, with a zone of high light intensity located at the center of the straight-line-motion overall beam or toward the interior of the corner, is achieved, with immovable light sources in an immovable module, merely by inclining a pivoting mirror.

FIGS. 5A-5C illustrate a state in which a vehicle has been detected and in which it is sought to create a third specific overall light beam 38 in which a target zone 40 of lesser illumination, into which no potentially dazzling light rays are projected, is formed. To this end, the first intermediate beam 24 and the second intermediate beam 26 are modified by shifting sideways at least one luminous section so as to create zones 30a and 30b of high intensity on either side of the target zone 40. As above, since the speed of the vehicle is higher than a first set threshold $V_1$, the width of the beam has been decreased by moving the exterior beam segments toward the center. The fact, by piloting the illuminating means, of excluding from the target zone, in which a lesser illumination is desired, the beam segments corresponding to this target zone, combined with the movement of exterior beam segments toward the center, generates a superposition of beam segments on either side of the zone of lesser illumination and therefore splits the zone 30 of high light intensity into two, not necessarily symmetric, portions on either side of the zone 40 of lesser illumination.

As above, when the low-beam situation is terminated, it is then possible to rapidly return to a high-speed, straight-line-motion situation with a zone 30 of high light intensity at the center of a beam similar to the first specific overall light beam (see FIG. 5C). It will be understood that according to the invention, the switch from one situation to the other, with a zone of high light intensity located at the center of the straight-line-motion overall beam or toward the interior of the corner, is achieved, with immovable light sources in an immovable module, merely by inclining a pivoting mirror.

According to one variant of the invention, provision will possibly be made, especially in the case of "pixel lighting", for the movement of the beam segments as a function of speed to be horizontal or vertical. Such as was described above, the horizontal movement of each beam portion is applied to each section individually, and it will advantageously be noted that the vertical movement is applied to the module in its entirety. To do this, microelectromechanical systems that are controllable on two perpendicular axes may be used. With such devices, the light of the zone to be turned off may be "ejected" both laterally, this being preferable for zones in the vicinity of the horizon, and vertically, upward or downward, this being more advantageous for zones located high up.

The above description clearly explains how the invention makes it possible to achieve the set objectives and especially to provide a method for controlling intermediate light beams that allows a segmented complementary high beam to be produced that may be modified so that, depending on the instantaneous speed of the vehicle relative to at least one preset speed threshold, a portion of the overall light beam is concentrated to form a zone of high light intensity, i.e. a zone illuminated more brightly than the immediately neighboring zones, without loss of light intensity on the whole, and without increasing the brightness of any of the light sources.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A method for controlling an overall light beam emitted by an automotive vehicle headlamp and formed from selectively activatable beam segments produced independently from one another by illuminating means borne by said headlamp, said beam segments together forming said overall light beam when they are all activated and placed successively side-by-side, wherein an instantaneous speed of a vehicle is compared to a first preset speed threshold ($V_1$), and wherein a zone of high light intensity to be produced when said instantaneous speed is higher than said first preset speed threshold is determined.

2. The method for controlling an overall light beam according to claim 1, wherein it is identified which among said illuminating means are producing said beam segments suitable for generating the illumination of said zone of high light intensity, and wherein a movement of said illuminating means identified in the preceding step and/or said illuminating means directly neighboring said illuminating means identified in the preceding step is piloted so as to create a first specific overall light beam including said zone of high light intensity.

3. The method for controlling an overall light beam according to claim 1, wherein all of said illuminating means are kept turned on.

4. The method for controlling an overall light beam according to claim 1, wherein all of said beam segment are moved so as to maintain a continuity of illumination on either side of said zone of high light intensity.

5. The method for controlling an overall light beam according to claim 1, wherein said instantaneous speed of said vehicle is compared to at least one second preset speed threshold ($V_2$) of higher value than said first speed threshold ($V_1$), and wherein, when said instantaneous speed is higher than said at least one second speed threshold ($V_2$), a light intensity of said zone of high light intensity is increased by superposing other beam segments and by concentrating the overall light beam.

6. The method for controlling an overall light beam according to claim 1, wherein an orientation of advance of said vehicle is detected, and wherein, when a situation of driving in a straight line is detected, said zone of high light intensity is placed, by superposing beam segments, substantially at the center of a first specific overall light beam.

7. The method for controlling an overall light beam according to claim 6, wherein, in a road scene in the vicinity of said vehicle, a specific situation in which a third-party vehicle is liable to be dazzled by said overall light beam is detected and a target zone in said overall light beam including said third-party vehicle is determined, wherein said illuminating means borne by said headlamp which are producing said beam segments generating the illumination of said target zone are identified, and wherein a movement of said illuminating means identified in the preceding step is piloted so as to create a zone of lesser illumination corresponding to said target zone, said zone of high light intensity then being split into two subzones placed on either side of said zone of lesser illumination.

8. The method for controlling an overall light beam according to claim 6, wherein in a road scene in the vicinity of said vehicle, a specific situation in which said vehicle is confronted with a corner is detected and a second target zone in said overall light beam depending on the characteristics of said corner is determined, wherein said illuminating means borne by said headlamp which are producing said beam segments generating the illumination of said second target zone are identified, and wherein a movement of said illuminating means identified in the preceding step is piloted so as to create a second zone of high light intensity corresponding to said second target zone.

9. The method for controlling an overall light beam according to claim 7, wherein said illuminating means are piloted, when it is detected that said specific situation has ended, to respectively take a position able to create said first specific overall light beam.

10. The method for controlling an overall light beam according to claim 1, wherein said illuminating means include light sources and optical deviating means associated respectively with at least one of said light sources, each light source being commanded to turn on individually whereas said optical deviating means are commanded to move individually.

11. The method for controlling an overall light beam according to claim 1, wherein said beam segments consist of vertical sections that are juxtaposed with one another, the movement of said illuminating means generating the movement of at least one of said sections and its superposition on other sections of said overall light beam.

12. A light-emitting module for implementing the controlling method according to claim 1, including a light source and movably mounted optical deviating means.

13. The light-emitting module according to claim 12, wherein it furthermore includes an optical system for emitting a light beam, said optical deviating means being inserted between said light source and said optical system.

14. The light-emitting module according to claim 12, wherein said optical deviating means consist of micro-opto-electro-mechanical systems mounted so as to be rotatable between two end positions.

15. An automotive lighting system including at least one light-emitting module according to claim 12, and at least one means for detecting the instantaneous speed of said vehicle, means for analyzing the received detection information and calculating means including at least means for comparing the instantaneous speed to at least one preset threshold in order to provide movement command instructions to said optical deviating means.

16. An automotive lighting system comprising:
at least one light-emitting module;
at least one detector for detecting an instantaneous speed of a vehicle; and
a controlling module for analyzing received detection information;
wherein said automotive lighting system selectively activates beam segments produced independently from one another by said at least one light-emitting module, said beam segments together forming an overall light beam when they are all activated and placed successively side-by-side, wherein an instantaneous speed of a vehicle is compared to a first preset speed threshold ($V_1$), and wherein said beam comprises a zone of high light intensity when said instantaneous speed is higher than said first preset speed threshold.

17. The automotive lighting system according to claim 16, wherein it is identified which among said at least one light-emitting module is producing said beam segments suitable for generating the illumination of said zone of high light intensity.

18. The automotive lighting system according to claim 16, wherein said at least one light-emitting module comprises a plurality of solid state light sources and wherein all of said plurality of solid state light sources are kept turned on.

19. The automotive lighting system according to claim 16, wherein all of said beam segments are moved so as to maintain a continuity of illumination on either side of said zone of high light intensity.

20. The automotive lighting system according to claim 16, wherein said instantaneous speed of said vehicle is compared to at least one second preset speed threshold ($V_2$) of higher value than said first speed threshold ($V_1$), and wherein, when said instantaneous speed is higher than said at least one second speed threshold ($V_2$), a light intensity of said zone of high light intensity is increased by superposing other beam segments and by concentrating said overall light beam.

* * * * *